(12) United States Patent
Bayne

(10) Patent No.: US 7,844,288 B2
(45) Date of Patent: *Nov. 30, 2010

(54) SYSTEM AND METHOD FOR THE DISTRIBUTION OF ADVERTISING AND ASSOCIATED COUPONS VIA MOBILE MEDIA PLATFORMS

(76) Inventor: Anthony J Bayne, 25315 Andreo Ave., Lomita, CA (US) 90717

(*) Notice: Subject to any disclaimer, the term of this patent is extended or adjusted under 35 U.S.C. 154(b) by 0 days.

This patent is subject to a terminal disclaimer.

(21) Appl. No.: 12/330,397

(22) Filed: Dec. 8, 2008

(65) Prior Publication Data

US 2009/0088219 A1    Apr. 2, 2009

Related U.S. Application Data

(63) Continuation of application No. 11/105,201, filed on Apr. 12, 2005, now Pat. No. 7,463,898.

(60) Provisional application No. 60/561,479, filed on Apr. 12, 2004, provisional application No. 60/563,394, filed on Apr. 19, 2004, provisional application No. 60/586,901, filed on Jul. 9, 2004, provisional application No. 60/587,769, filed on Jul. 14, 2004, provisional application No. 60/608,664, filed on Sep. 11, 2004, provisional application No. 60/627,891, filed on Nov. 15, 2004.

(51) Int. Cl.
*H04M 7/20* (2006.01)

(52) U.S. Cl. ............... 455/466; 455/550.1; 455/412.1; 455/575.1

(58) Field of Classification Search ............. 455/550.1, 455/466, 412.1, 575.1
See application file for complete search history.

(56) References Cited

U.S. PATENT DOCUMENTS 5,336,327 A    8/1994    Lee (Continued)

FOREIGN PATENT DOCUMENTS

FR    2790894    6/2001

(Continued)

*Primary Examiner*—Patrick N. Edouard
*Assistant Examiner*—Justin Y Lee
(74) *Attorney, Agent, or Firm*—Knobbe Martens Olson & Bear LLP

(57) ABSTRACT

A mobile terminal apparatus, systems, and methods for a mobile service provider to deliver advertising content, via a wireless protocol, to a user's mobile terminal are provided. The user's mobile terminal may be both multimedia and Bluetooth enabled, and may be able to be located by the service provider when it is powered on, so that the advertising content presented may be relevant to the viewer's location. When the mobile terminal is presenting advertising content according to the invention, it may simultaneously transmit to other nearby Bluetooth enabled devices, digital coupons that can be used by the recipients for the advertiser's products or services. Some embodiments include a mobile terminal having a display that folds into a second orientation, above or alongside the mobile terminal's main profile to face outward, so that persons standing by can see the advertising being displayed, as hands-free functionality will be temporarily suspended requiring the user to hold the terminal at his ear to speak. The user may receive incentives (reduced/free minutes, free content, e.g., ring tones, etc.) to use the terminal. Service providers will receive advertising revenues and an effective means to monitor the effectiveness of a mobile advertising campaign. Nearby people may receive information and electronic coupons, and advertisers will receive brand recognition.

20 Claims, 13 Drawing Sheets

U.S. PATENT DOCUMENTS

| | | |
|---|---|---|
| 6,275,714 B1 | 8/2001 | Kintz et al. |
| 6,359,984 B1 | 3/2002 | Kim |
| 6,584,323 B1 | 6/2003 | Son |
| 6,658,274 B1 | 12/2003 | Yang |
| 7,027,801 B1 | 4/2006 | Hall et al. |
| 7,463,898 B2 * | 12/2008 | Bayne ................. 455/466 |
| 2002/0086711 A1 | 7/2002 | Flannery |
| 2002/0087656 A1 | 7/2002 | Gargiulo et al. |
| 2002/0094826 A1 | 7/2002 | Lee |
| 2002/0120681 A1 | 8/2002 | Cho et al. |
| 2003/0032409 A1 | 2/2003 | Hutcheson et al. |
| 2003/0050837 A1 | 3/2003 | Kim |
| 2003/0114198 A1 | 6/2003 | Han |
| 2003/0222853 A1 | 12/2003 | Kim |
| 2003/0224773 A1 | 12/2003 | Deeds et al. |
| 2003/0228847 A1 | 12/2003 | Matsumoto |
| 2004/0012620 A1 | 1/2004 | Buhler et al. |
| 2004/0038665 A1 | 2/2004 | Hosono |
| 2004/0047244 A1 | 3/2004 | Iino et al. |
| 2004/0058656 A1 | 3/2004 | Chikaishi |
| 2004/0121825 A1 | 6/2004 | Ma et al. |
| 2004/0142720 A1 | 7/2004 | Methers |
| 2004/0198458 A1 | 10/2004 | Kawamura |
| 2004/0224705 A1 | 11/2004 | Nishimura |
| 2004/0259599 A1 | 12/2004 | Okawa |
| 2005/0024339 A1 | 2/2005 | Yamazaki et al. |
| 2005/0049008 A1 | 3/2005 | Muto |
| 2005/0177416 A1 | 8/2005 | Linden |
| 2005/0287953 A1 | 12/2005 | Ikeda et al. |
| 2006/0089160 A1 | 4/2006 | Othmer |

FOREIGN PATENT DOCUMENTS

| | | |
|---|---|---|
| GB | 2343324 | 5/2000 |
| GB | 2388271 | 11/2003 |
| JP | 2001211270 | 8/2001 |
| JP | 2001320450 | 11/2001 |
| JP | 2002118656 | 4/2002 |
| JP | 2002135427 | 9/2002 |
| JP | 2002258879 | 9/2002 |
| JP | 2003317002 | 11/2003 |
| WO | WO 01/48581 | 7/2001 |

* cited by examiner

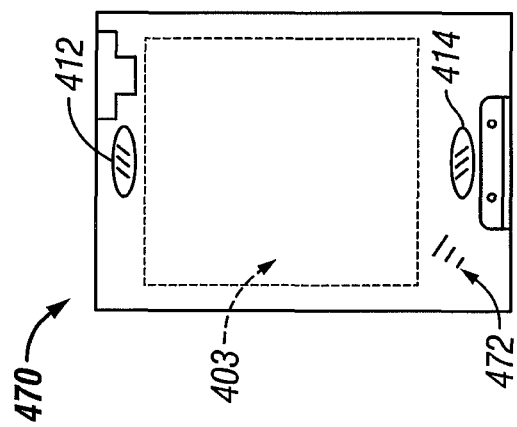
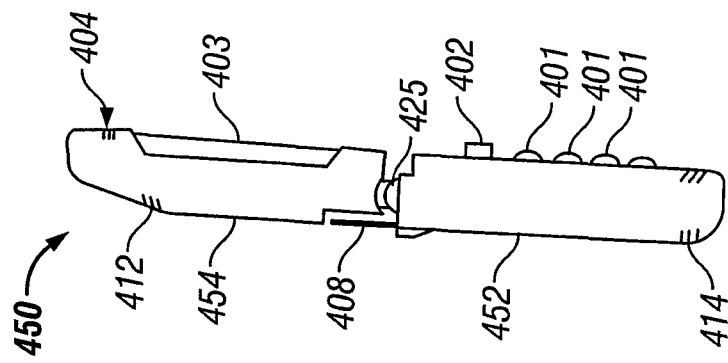
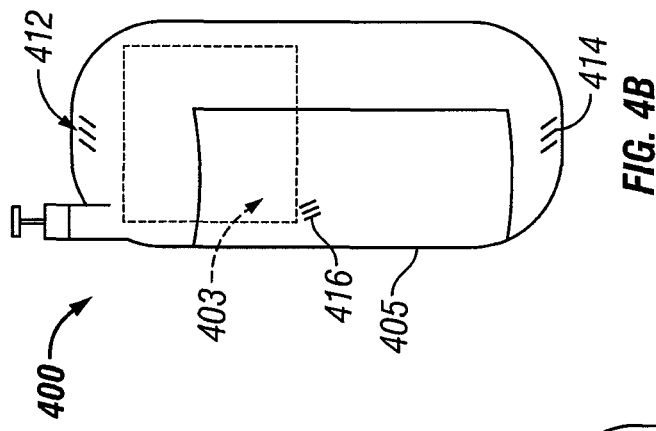
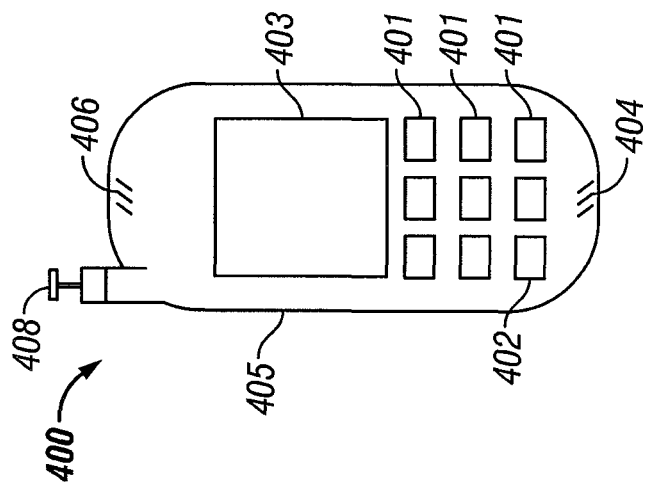

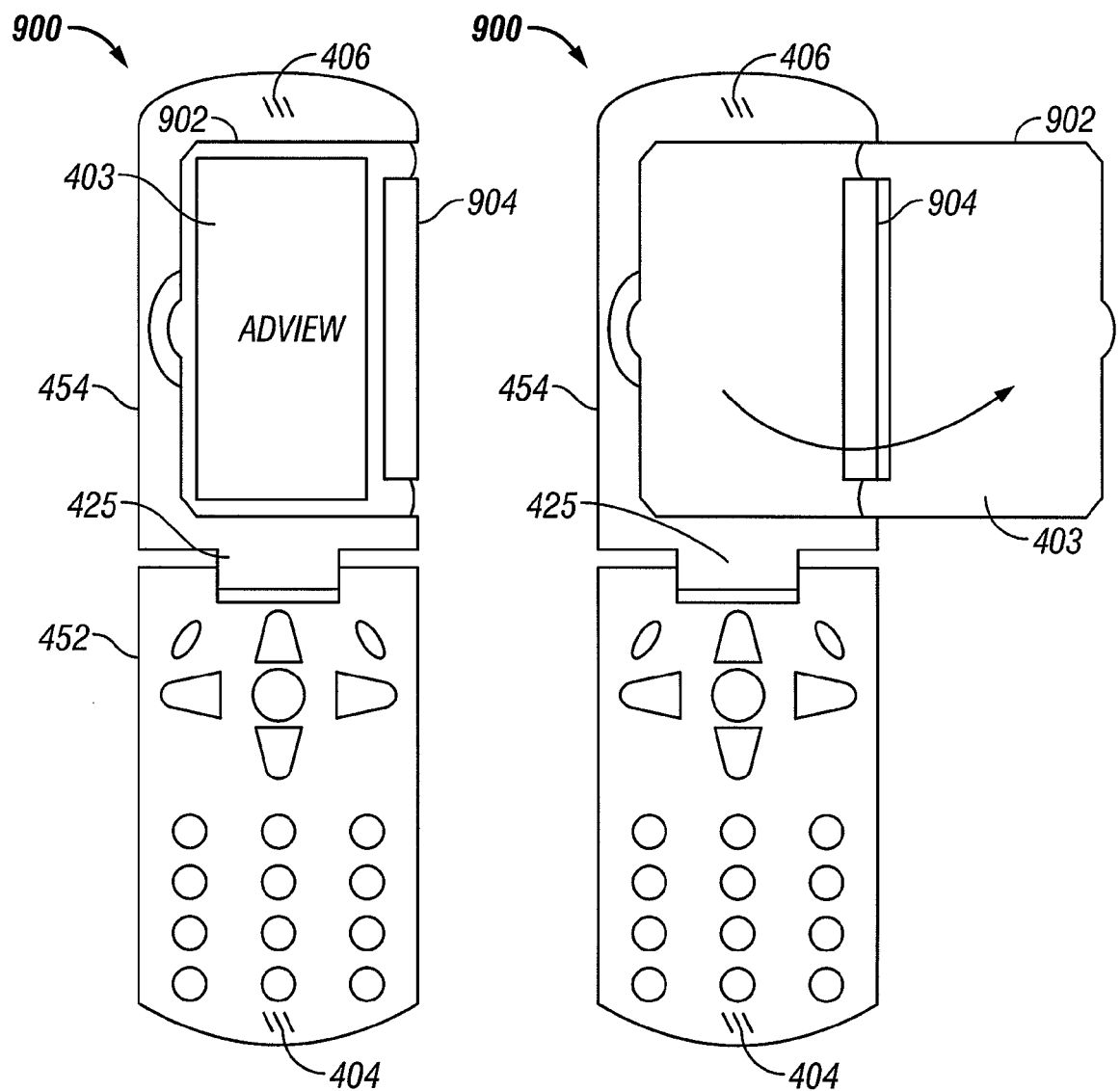
*FIG. 9A*  *FIG. 9B*

SYSTEM AND METHOD FOR THE DISTRIBUTION OF ADVERTISING AND ASSOCIATED COUPONS VIA MOBILE MEDIA PLATFORMS

RELATED APPLICATIONS

This application is a continuation of U.S. patent application Ser. No. 11/105,201, filed Apr. 12, 2005, which claims the benefit of priority to U.S. Provisional Application Ser. No. 60/561,479 filed Apr. 12, 2004, Ser. No. 60/563,394 filed Apr. 19, 2004, Ser. No. 60/586,901 filed Jul. 9, 2004, Ser. No. 60/587,769 filed Jul. 14, 2004, Ser. No. 60/608,664 filed Sep. 11, 2004, and Ser. No. 60/627,891 filed Nov. 15, 2004. Each of the foregoing applications is hereby incorporated by reference in its entirety.

BACKGROUND OF THE INVENTION

1. Field of the Invention

The present invention relates to mobile terminals systems, and more particularly to transmission and presentation of information on display of mobile terminals.

2. Description of the Related Technology

There are presently over one billion global mobile subscribers and over 100 million mobile data subscribers. Subscribers having multimedia messaging services (MMS) equipped mobile terminals such as smart phones, phone enabled PDA'S, and phone enabled pocket PC's (mobile terminal) can access the Internet via various wireless protocols (e.g. wireless access protocol (WAP), i-Mode, etc.) to download data ("content") from websites. Content includes text, audio and still and video images. MMS is an extension to short message service (SMS) protocol, and it defines a way to send and receive wireless content.

Many of these terminals are able to download and display streaming video over various "third generation" (3G) GSM (global system for mobile communications) based high speed data networks (e.g. "EDGE"—Enhanced Data Rates for GSM Evolution, "EV-DO"—Evolution Data Optimized, "UMTS"/"W-CDMA"—Universal Mobile Telecommunications System/Wideband Code Division Multiple Access) Subscribers are charged for the quantity of content downloaded, the time spent downloading the content, or a flat monthly fee.

Bluetooth is a standard wireless (short range radio link) technology that operates in the unlicensed 2.4 GHz ISM band and which allows users to make connections between like enabled mobile terminals and computers. It is a global standard that is supported by leaders in telecommunications and consumer electronics. According to Bluetooth Special Interest Group (SIG) over 1 million enabled devices ship each week, and by 2007 it is estimated that nearly 50% of all mobile phones in the United States will be Bluetooth enabled.

Competition between wireless service providers is fierce. Service providers compete on points of differentiation, including terminal variety, applications, "coverage" (the cellular geographic service area—CGSA) and price, both of the terminal itself and calling plans. Since many of the offerings are very similar, service providers are forced to compete on service plan price per minute charges. The result is downward pressure on the price per minute of a call. So, while subscribers continue to use more minutes, the cost to speak continues to fall, resulting in a drop in the monthly average revenue per user (ARPU). Therefore, there remains a need for a system better serve the users, increase efficiency, etc.

Service providers enter into agreements with Internet service providers to enhance the subscriber's mobile Internet experience. Service providers and Internet service providers can earn money for advertising presented during a wireless Internet session, and advertisers may motivate someone to buy their product/service, build brand awareness, etc. On the other hand, subscribers are often annoyed by unwanted e-mail and Internet advertising (SPAM), especially if they are charged for the time spent deleting the SPAM. Therefore there remains a need to provide value to the subscriber for advertising to be displayed on his or her handset.

Advertisers seek to attract consumers to their product, build brand identity, and make sales. For example, persons in malls are often there to spend money, but may not be aware of a sale in a particular department store. Visual advertising, at eye level, promoting a sale at a store in the mall may catch the eye of a shopper while standing in line waiting to make a purchase. Sandwich board advertising was the location-based advertising of yesteryear. Today, service providers using various location-based technologies, handset centric (e.g. global positioning system (GPS), cell of origin (COO)) and network technologies (e.g. time of arrival (TOA)) to deliver information (i.e. advertising) to mobile terminal users that is relevant to the user's location (e.g. nearest ATM to subscriber). The newly informed person may go to the store advertised and make a purchase. However, privacy remains a concern, as many people do not like the idea of being "tracked". Therefore, there remains a need to respect a subscriber's privacy while still providing advertising that is both easily viewed and location based.

Many advertisers have coupons printed in newspapers to build brand awareness. Because it takes time to purchase a paper, find the coupon, cut the coupon, and transport the coupon to a store to redeem it. While consumers can save money-using coupons, many do not think the effort is worth it. Therefore, a need remains for a better way to distribute advertiser's coupons.

Many service providers already deliver free informational messages (i.e. advertising) to their customers at no charge. There is usually no immediate benefit to the receiver of this free information, and so there remains a need for the subscriber to get some benefit for having his terminal display it.

Mobile service providers who present advertising on mobile terminals, generally present advertising to only one person at a time, the subscriber. This is true even if the subscriber is in a crowded public area. Therefore there remains a need to present advertising to a larger audience.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include providing a way of improving the efficiency of mobile telephony, providing a way of displaying advertising in locations likely to be useful for both the advertiser and the viewer, and for tracking the effectiveness of such advertising.

One embodiment is a mobile communication terminal including a housing adapted to be held by a user. The terminal further includes a transceiver disposed within the housing and configured to transmit and receive voice data, the transceiver further configured to receive multi media content. The terminal further includes a first earpiece disposed within the housing and configured to output the voice data. The terminal further includes a display disposed in the housing and configured to display the multimedia content. The housing is configured such that the display is positionable so that the multimedia content displayed on the display is viewable by at least one other person when the first earpiece is positioned in proximity to an ear of the user.

Another embodiment is a method of measuring the effectiveness of a mobile advertising campaign using a first mobile terminal having a display configured to display data to at least one other person other than a user when the terminal is positioned proximate to the ear of the user. The method includes presenting an advertisement on the display so as to be visible to at least one viewer other than the user, identifying a second mobile terminal of the at least one viewer, communicating a coupon to the second mobile terminal, and storing data indicative of whether the at least one viewer redeems the coupon.

Another embodiment is a mobile communication terminal. The terminal includes means for communicating voice data and multi media content, means for outputting the voice data to the ear of a user, means for displaying the multimedia content, and means for positioning the means for displaying so that the multimedia content is viewable by at least one other person when means for outputting voice data is positioned at the ear of the user.

Another embodiment is a system for measuring the effectiveness of a mobile advertising campaign using a first mobile terminal having a display configured to display data when positioned proximately to the ear of a user. The system includes a server configured to communicate an advertisement to the first mobile terminal for display on the display so as to be visible to at least one viewer other than the user, communicate a coupon to the first mobile terminal for transmission to a second mobile terminal, and receive data indicative of whether the at least one viewer redeems the coupon. The system further includes a database configured to store data indicative of whether the at least one viewer redeems the coupon.

Another embodiment is a method of measuring the effectiveness of a mobile advertising campaign using a first mobile terminal having a display configured to display data when positioned proximately to the ear of a user. The method includes communicating an advertisement to the first mobile terminal for display on the display so as to be visible to at least one viewer other than the user. The method further includes communicating a coupon to the first mobile terminal for transmission to a second mobile terminal. The method further includes receiving data indicative of whether the at least one viewer redeems the coupon. The method further includes storing data indicative of whether the at least one viewer redeems the coupon.

Another embodiment is a method of providing incentives to a user of a mobile terminal. The method includes providing at least one advertisement for display on the mobile terminal, providing at least one coupon associated with the advertisement to the mobile terminal for communication to other mobile terminals, storing data indicative of redemption of the at least one coupon, and providing incentives to the user of the mobile terminal based on the data indicative of redemption.

Another embodiment is a system for providing incentives to a user of a mobile terminal. The system includes means for providing at least one advertisement for display on the mobile terminal, means for providing at least one coupon associated with the advertisement to the mobile terminal for communication to other mobile terminals, means for storing data indicative of redemption of the at least one coupon, and means for providing incentives to the user of the mobile terminal based on the data indicative of redemption.

BRIEF DESCRIPTION OF THE DRAWINGS

FIG. 4a-4d are diagrams that illustrate views of exemplary handsets having a "candy bar" style mobile terminal, clam shell style mobile terminal and phone enabled PDA, each having a second rear ear phone and microphone, which may be included in the exemplary system of FIG. 1.

FIGS. 9a-9c are diagrams that illustrate several views of an example of external construction of a clam shell style mobile terminal having a display that is hinged to unfold perpendicularly to the clam shell hinge.

DETAILED DESCRIPTION OF CERTAIN EMBODIMENTS

Figure 1:
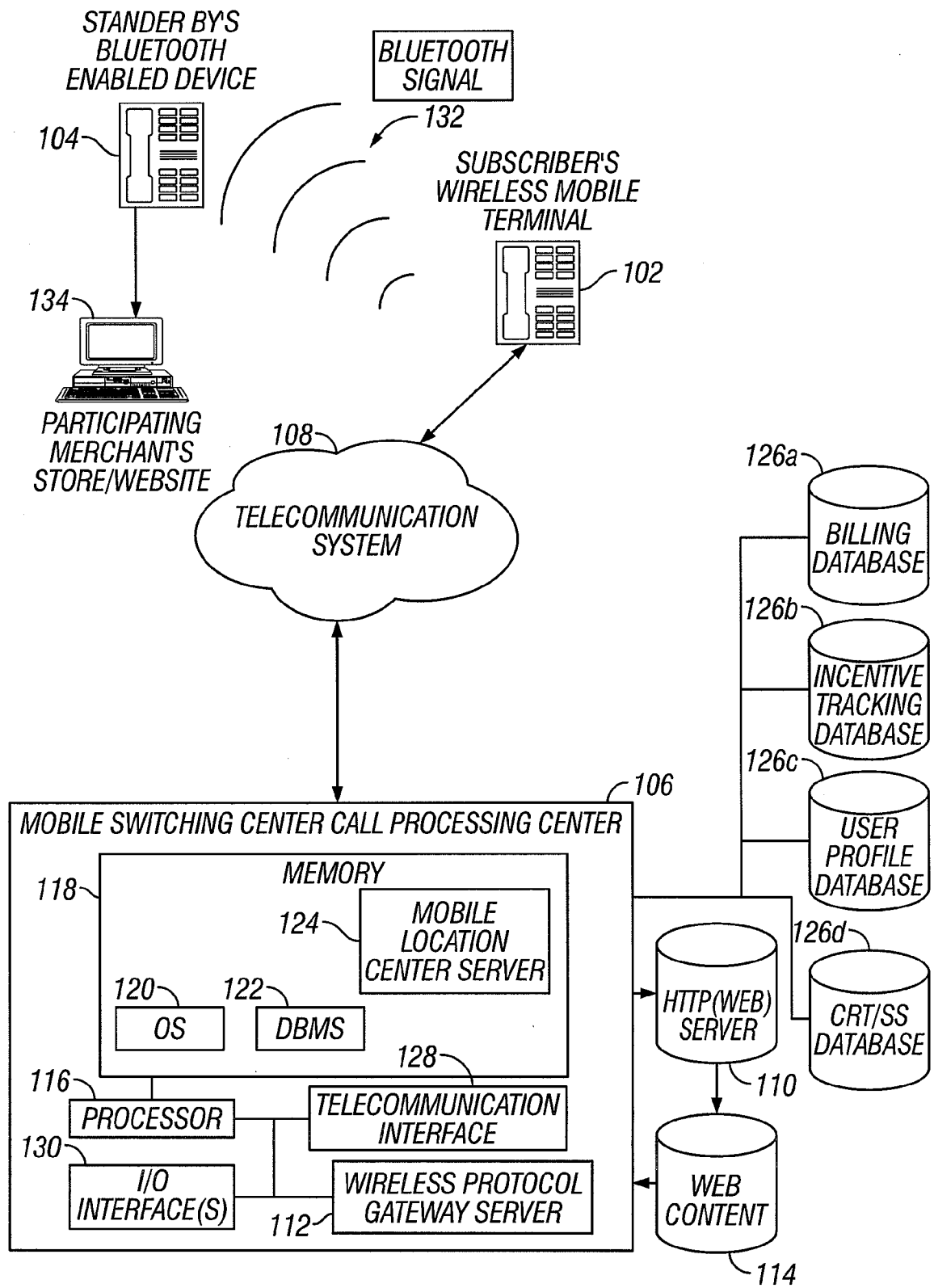
FIG. 1 is a block diagram illustrating an exemplary system for provding an "AdView" mode in which a mobile terminal displays advertising to nearby viewers.

The following detailed description is directed to certain specific embodiments of the invention. However, the invention can be embodied in a multitude of different ways as defined and covered by the claims. In this description, reference is made to the drawings wherein like parts are designated with like numerals throughout.

Embodiments include an apparatus, system and method for providing a new wireless multimedia mobile terminal (terminal) that includes a Bluetooth transceiver, and has a display device such as a liquid crystal digital (LCD) screen that can be unfolded or rotated into a second orientation to face away from a user thereof, such as a subscriber, in the opposite direction of a first orientation, to display advertising while the user holds the phone to his ear to speak. While the terminal is in this second orientation displaying advertising, the terminals Bluetooth functionality may locate and transmit digital coupons related to the displayed advertising to nearby Bluetooth enabled devices.

In addition to transmitting a digital coupons, the users terminal may also transmit a unique user identifier (e.g. the user's mobile identity number "MIN") that is re-transmitted or otherwise presented by the receiving person, when the receiving person redeems the coupon at an advertisers website, or participating merchant's store/website, so that the transmitting user may earn incentives, and so that the advertiser/service provider can measure the effectiveness of any advertising campaign using this invention.

In a preferred embodiment of the system, the 3G mobile network operator will track the location of the terminal. When it is determined that the terminal is in an area that is likely to be densely populated (e.g. a Pico cell area inside a mall). The system will message the user (MMS message, ring tone, etc.) that the user may earn incentives (discounted usage, credits toward earning free content, etc.) if he chooses to use the terminal in "AdView" now In one embodiment, AdView occurs when the user or user places the flat panel display of the terminal into a second orientation, so that flat panel display faces outward to display advertising. To help ensure that the ad is visible, in one embodiment, speakerphone functionality of the terminal and other "hands free" modes of operation are disabled. Rather the phone is held at the ear of the user, so as to be at the eye level of any person standing or sitting near the user. The flat panel display thus orientated can display MMS video advertising that was previously downloaded by the user, or automatically delivered from the service provider. Other use criteria can be factored in as well, such as the date and time of day. The system can give full or partial credits toward incentives based on criteria established by the service provider.

In another embodiment of the system, a user can take the initiative to go into AdView. The user can enter the phone number as he normally would, but then places the flat panel display in its second orientation instead of pressing a "Send" key or other call button to make a call. The placing of the flat panel display can simultaneously initiate an AdView session and dial the number entered. The system can track a start/stop time to record the overlapping time the call is made and AdView use. In this way the system credits the user with any available incentive. The phone in AdView temporarily suspends the functionality of the speaker and hands free functions of the terminal to insure that the handset is held to the ear of the user to talk, so others will see the screen.

Embodiments include systems and methods for sending advertising content, via a transport protocol (e.g. WAP), to mobile users having MMS enabled terminals. For example, in one embodiment, the terminal is held at the ear of the user to speak while advertising is being displayed on a flat panel display that folds upward or alongside the main profile of the mobile terminal to face outward in its second orientation, or that rotates 180 degrees to face outward in the case of a clam shell style mobile terminal. In this second orientation persons standing within a few feet of the user will see the advertisement being displayed. While the screen is in this position, handsfree functionality (earpiece and speaker phone) will be suspended to insure that the user has the terminal at his ear to talk, thereby positioning the flat panel display at approximately eye-level of persons standing nearby. The terminal may invert or otherwise rotate the image so that it appears right side up to persons standing by the user, to thereby accommodate the flat panel display in its second orientation.

Although the following description of exemplary embodiments of a wireless handset device will be presented in the context of a "terminal", it should be understood that the description may also be applicable to other embodiments such as Smart phones, phone enabled PDAs and Pocket PC's, as well as other mobile devices that have access to the internet and MMS capabilities. Thus, the term "terminal" as used herein should be broadly construed as to encompass any type of mobile device that is capable of downloading multi media content and displaying that content as described herein.

Embodiments may be used to establish a new revenue stream for participating mobile phone service providers and to also provide a benefit to the user. Presently, mobile phone companies send advertising to user's terminals, to be viewed by the user on the terminal's flat panel display. So, even if the person looks at the screen, the service provider has made one presentation to one (1) person. The user gets no immediate benefit of being the recipient of the advertising. The disclosed invention utilizes the factors of the user's estimated location, date and time to determine the probability that many persons may be near the user to view a sent advertisement if the user goes into AdView. In this way many persons may be able to see the advertisement. Likewise, the user may receive incentives, such as the benefit of using the phone for free/discounted minutes, earning credits to get free ring tones, or other downloads for speaking on the terminal in AdView.

Embodiments also provide benefits to persons within Bluetooth transmission range of the user while the terminal is displaying in AdView. The terminal may have a Bluetooth profile stack (software) to support applications such as "Inquiry," to locate Bluetooth enabled devices within a range that might encompass persons who can potentially see the flat panel display in its second orientation, or "Object Push Profile" (OPP), to automatically locate and transmit a digital coupon associated with the advertising being displayed by the terminal. The coupon may be downloaded along with the advertising content. For example "Coke" is flashing the well-known "Coke" logo from the screen in AdView. Nearby persons having a Bluetooth enabled device in "discoverable/visible" mode can accept a coupon transmitted by the device to print and redeem later at the advertising sponsor's store or website. In this way advertisers build brand awareness, and persons nearby may save money by using the coupon. AdView would make the terminal a wireless piñataAdditionally, a unique user identifier may also be transmitted with the coupon, so that when the receiving person retransmits the coupon for redemption, the user may earn incentives, and advertisers/service providers can monitor the effectiveness of an ad campaign using the disclosed apparatus and methods.

FIG. 1 is a block diagram illustrating an exemplary operating environment for implementation of certain embodiments of the present invention. The exemplary operating environment includes at least two (2) wireless handset terminals 102 and 104 that are Bluetooth enabled. The user's terminal 102 is MMS and AdView enabled. The user's terminal 102 includes a transceiver for an over the air interface such as GSM or CDMA to communicate with a Mobile Switching Center (MSC) call processing system 106. A 3G telecommunication system 108 connects the user's phone 102 and the MSC 106, and the MSC 106 connects the user's terminal 102 to an HTTP (internet web) server 110 via a wireless protocol gateway server 112 in the MSC 106. The HTTP server 110 connects the user's terminal 102 to at least one website 114 containing downloadable advertising content. For purpose of illustration the wireless protocol gateway server 112 will be discussed in terms a of a "WAP gateway", as it is the most common standard, but it is only meant to be an illustration and not meant to be a limitation, as the gateway can be any wireless protocol compatible with the phone service provider's network platform.

The telecommunication system 108 may be any public and/or private communication network. In certain embodiments, the telecommunication system 108 is the Public Switched Telephone Network (PSTN). The telecommunication system 108 may include wired and/or wireless segments and may carry digital and/or analog signals. In alternate embodiments, the telecommunication system 108 may take other forms, such as a voice over IP network or other types of data networks. The various components and functionality of typical telecommunication systems 108 are well known in the art and are therefore not reiterated herein.

The user's terminal 102 may be any wireless communication device that is configured to access web content 114 and interact with a telecommunication system 108. For example, the user's terminal 102 can be replaced or supplemented by other communication devices, such as wireless hand-held phone enabled computers ("Pocket PC"), wireless phone enabled personal digital assistants ("PDA"), digital phones, smart phones, etc., as may be appropriate. A person standing by the user ("standers by") phone 104 may have a Bluetooth enabled device 104, which may or may not be wireless.

In one embodiment, the MSC call processing system 106 is a processor-driven device or collection of devices that is configured for receiving and processing wireless terminal communications from, and initiating and transmitting wireless communications to, the user's wireless terminal 102. Further, the MSC call processing system 106 will link the user's terminal 102 through a WAP gateway 112 to an internet HTTP server 110 hosting a web page 114 having downloadable content. The MSC call processing system 106 may further be configured for accessing and reading associated computer-readable media having stored thereon data and/or computer-executable instructions for implementing the various methods of the present invention. In particular, a processor 116 for processing data and executing computer-executable instructions may drive the MSC call processing system 106. The MSC call processing system 106 also includes a memory 118, which may take the form of any computer-readable medium. The memory 118 may be logically and/or physically divided into multiple units.

The memory 118 stores data and program modules, such as, for example, an operating system ("OS") 120, a database management system ("DBMS") 122, Mobile Location Center Server (MLCS) 124. These and/or other programs may be executed by the MSC call processing system 106 to perform the various methods of the present invention. By way of example, the MLCS 124 may provide functionality for calculating the location of the user's terminal 102 by any location finding scheme, such as COO, TOA, GPS and select and transmit location specific information to the user's terminal 102 (e.g. advertising).

Portions of the system such as the MSC call processing systems, MLCS, wireless protocols to access the internet from mobile devices, and Bluetooth functionality are well known in the art and are therefore not explained in detail herein. Those skilled in the art will appreciate that such functionality may be combined into fewer program modules or distributed among a greater number of modules than are illustrated in FIG. 1. In addition, such functionality may be distributed across multiple processor-driven devices, such as dedicated network servers, that collectively form the MSC call processing system 106.

The MSC call processing system 106 may include or be in communication with one or more databases. By way of illustration only, the MSC call processing system 106 may be in communication with a billing database 126a for storing payment information, an incentive tracking database 126b for calculating and storing the amount of credits the user has earned toward incentives using the disclosed invention, during a billing cycle, and a User Profile database 126c for storing the capabilities and settings of the users mobile terminal 102 as well as recording an user preferences (e.g. the types of advertisements the user may prefer or not want transmitted to the terminal), and a coupon redemption tracking/user source (CRT/SS) database 126d for the determining of which user to credit for the distribution of the coupon and for the measuring of the effectiveness of a mobile advertising campaign.

These and/or other databases may also store any other data used or generated by the MSC call processing system 106. Those skilled in the art will appreciate that the illustrated databases 126a-c may be physically and/or logically separate from one another. For security, the MSC call processing system 106 may have a dedicated connection to the databases 126a-c, as shown. However, the MSC call processing system 106 may also communicate with one or more of the databases 126a-c via the telecommunication system 108 or other network.

The MSC call processing system 106 may communicate periodically with the HTTP server 110 to determine if there is any new advertising content available. If new web page advertising content 114 is found, the MSC call processing system 106 may query the User Profile 126c to compare the category of the new content to any preferences in the User Profile 126c. If a match is found, the MSC call processing system may then determine if there is any parameter to the content (e.g. Advertiser requires that it be shown only in a certain area). If so, the MLCS 124 determines the location of the user's terminal 102 and compares this information with the parameter. If the user's terminal 102 is found to be within the advertiser's parameters, the MSC call processing system 106 initiates a "PUSH" (the sending of information to a mobile terminal user without a specific request for it) transmission to the user's terminal 102 notifying him of the opportunity to earn credits toward incentives for using the disclosed invention in AdView. If the there is no new advertising content, or if new, the advertising content category does not match a preference in a user's User Profile 126c, or if the user's terminal 102 is not in the advertiser's parameters, the MSC call processing system 106 may not PUSH. Any wireless message communication type may notify the user of a PUSH session. Wireless messaging is well known in the art and not explained in detail herein.

Wireless communications calls may be received at the MSC call processing system 106 through a telecommunication interface 128. The telecommunication interface 128 may take the form of a telephony line card or other suitable hardware and/or software for connecting the MSC call processing system 106 to the telecommunication system 108 and providing the logical connection between the MSC call processing system 106 and a user's wireless terminal 102. The telecommunication interface 128 thus allows the user to interact with the MSC call processing system 106 by providing request commands (e.g. menu selection to access the internet) that can be interpreted by the MSC call-processing system 106. The MSC call-processing system 106 may be configured with additional and/or other communication interfaces for providing logical connections to other types of communication devices and networks.

The MSC call processing system 106 may also include input/output ("I/O") interface(s) 130 for providing logical connections to various I/O devices, such as a keyboard, a mouse, a microphone, a printer, a scanner, speakers, a display, etc. A system administrator may utilize these and other I/O devices to interact with the MSC call processing system 106. For example, a system administrator may interact with the MSC call processing center 106 to populate and edit the User Profile database 126c, download billing information from the billing database 126a, alter the parameters for the MLCS 124, etc. Those skilled in the art will appreciate that the MSC call processing system 106 may include alternate and/or additional components, hardware or software.

Thus configured or similarly configured, the MSC call processing system 106 may provide the hardware and software to support the creation and maintenance of an interactive, location enabled, advertising, incentive based system associated with a user's account. In one embodiment the user may only download advertising content 114 from a website controlled by the service provider. The user having a WAP enabled terminal 102 types the address of a web site 114 he wishes to access by using the keypad. The micro browser then sends the request over the airwaves as a digital signal to a cell phone transmission tower, that relays it by landline to the MSC call processing center 106, having a wireless protocol gateway server "a WAP gateway" 112, whose software finds the HTTP server 110 and retrieves the specific web page content 114. The wireless protocol gateway server's 112 software encodes the HTTP data, from HTML (the common language of the Internet) to a wireless markup language (WML). The WML-encoded data is sent to the user's terminal 102 to be displayed via AdView. Simultaneously, while the encoded data (e.g. advertising) is being displayed, the user's terminal 102 may transmit, via a Bluetooth signal 132, digital coupons to Standers-by having a Bluetooth enabled device 104.

A terminal 104 of a person standing nearby, having received the user's transmission 132, including a coupon in digital form along with the user's wireless mobile terminal's 102 unique identifier, may redeem the coupon at a participating merchant's store or website 134. The store or website 134 will then communicate this information to the MSC 106 via the telephone system or other network 108 to update the coupon redemption tracking/user source (CRT/SS) database 126d for the measuring of the effectiveness of a mobile advertising campaign. Additionally, this information may be communicated to the incentive tracking database 126b for crediting the user for transmitting the coupon.

In certain embodiments, all content retrieval, encoding, tracking, and transmission and verification services involving the user are handled by the telecommunication system 108, for example, by a participating wireless service provider phone company.

The call processing system 106 may track the user's terminal 102 while it is powered on, and periodically communicate with the Mobile Location Center Server (MLCS) 124 to determine if the user is in a "Sponsored Location". A Sponsored Location is a population dense cell (or Pico cell) that the Service Provider has contracted with the advertiser to present advertising in, via the described invention. A location-based application located on the MLCS 124, may further analyze the value of making any advertising presentation by date and time. For example sending an advertisement to a terminal in a Sponsored Location (e.g. a commuter train path) during the normal workweek, during rush hour, would be valuable as many persons might see it. However the same location, on a date or time when the commuter train is thinly used (e.g. Sunday at 3:00 AM) might not be worth sending. Once it is determined that user's terminal 102 is in a Sponsored Location, and he is qualified to receive credits for using the terminal in AdView mode, the service provider initiates PUSH in an attempt to notifying the user. The user may respond by rejecting the message by depressing "end" or other key on the user's terminal 102, ignore the notification, or accepting the invitation by moving the flat panel display into its second orientation, which results in Auto Receive of the MMS advertisement which will be displayed on the flat panel display. The user's mobile terminal 102 may have AdView "opt-in" and "opt-out" buttons, or similar keys, on it to avoid unwanted PUSH solicitations by the service provider, and comply with any applicable privacy law or regulation.

Those skilled in the art will appreciate that the operating environment shown in and described with respect to FIG. 1 is provided by way of example only. Numerous other operating environments, system architectures and device configurations are possible. For example, the MSC call processing center 106 may in certain embodiments be implemented at or within an existing telecommunications system. In other embodiments, various components of the PSTN may be adapted for performing the functionally described with respect to the present invention. Accordingly, the invention should not be construed as being limited to any particular operating environment, system architecture or device configuration.

Figure 2A:
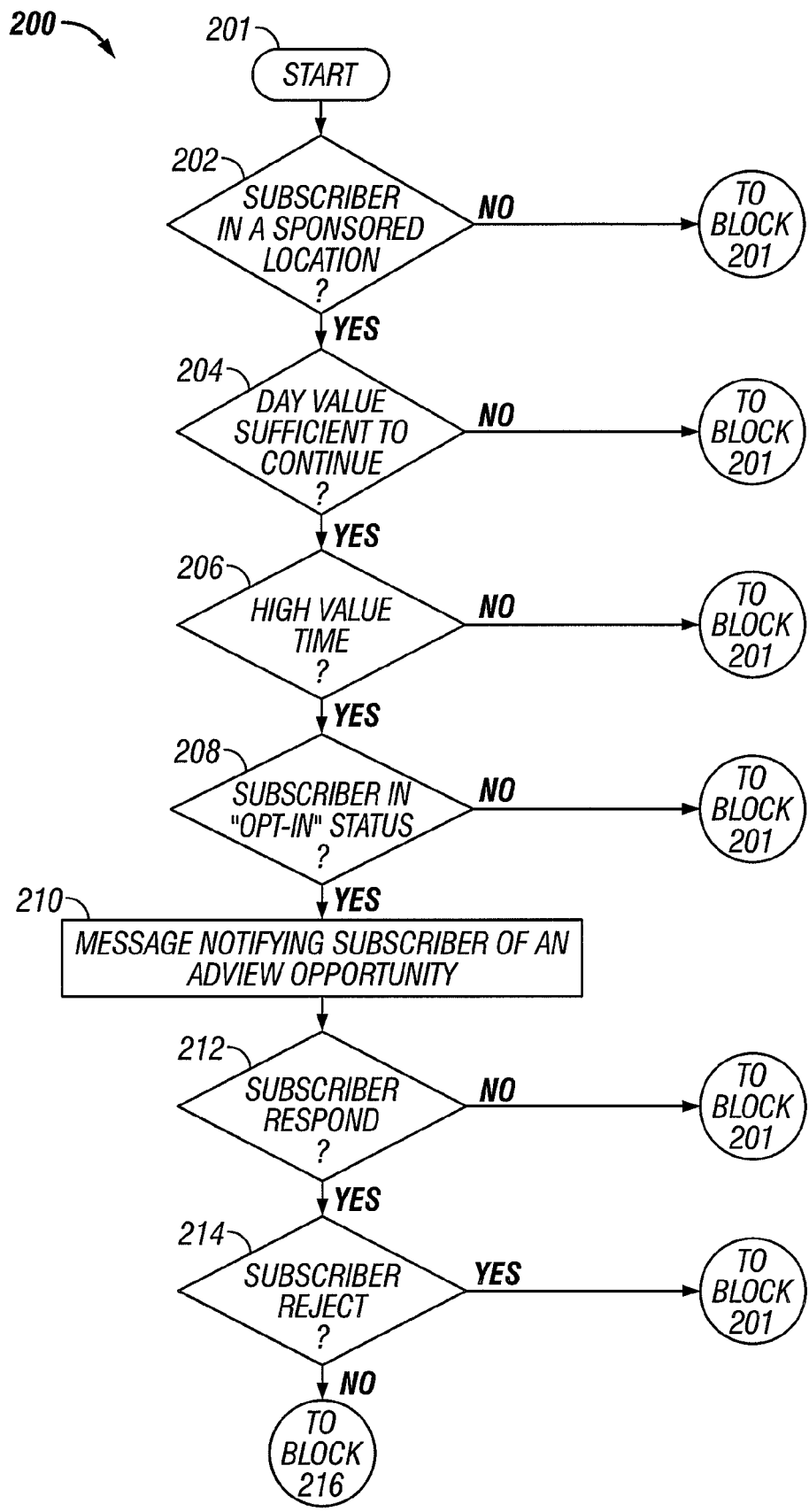
FIG. 2a and FIG. 2b are flowcharts illustrating an exemplary method for conducting a system-initiated session of the "AdView" mode of FIG. 1.
Figure 2B:
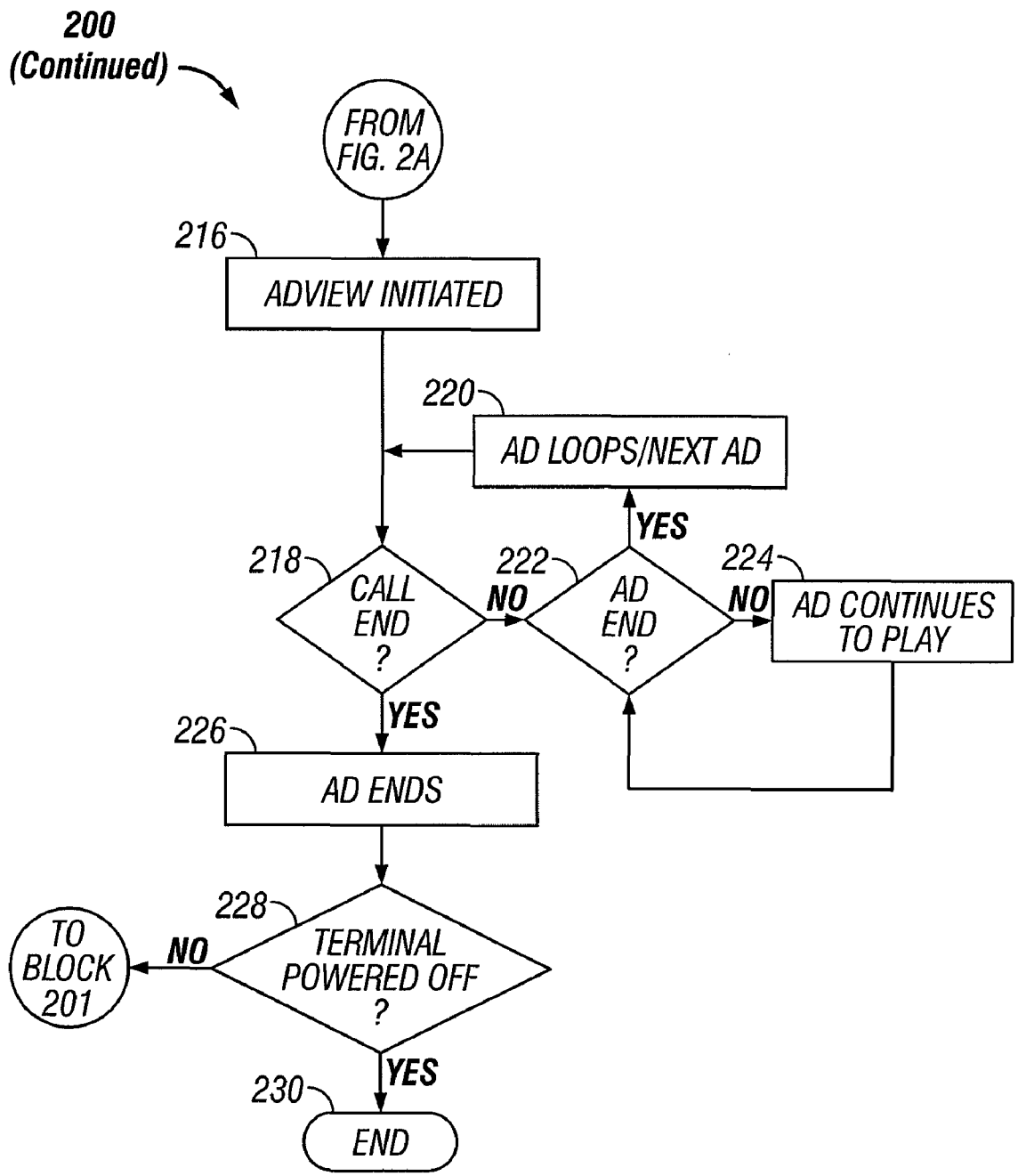

FIG. 2 is a flow diagram illustrating an exemplary method for a service provider initiated AdView session with a user in accordance with certain embodiments of the invention. The method begins at starting block 201, which represents the normal operating state of a user's wireless mobile terminal 102 that is powered on, with good signal strength. The method progresses to block 202, where the MSC call processing system 106 queries the MLCS 124 to determine whether or not the user's mobile wireless terminal 102 is in sponsored location. If it is determined that the user's mobile wireless terminal 102 is not in a sponsored location the method returns to starting block 201, and the system continues normal operation.

If the MSC call processing system 106 determines that the user's mobile wireless terminal 102 is in sponsored location, the method proceeds to block 204 where a query is made of the MLCS 124 to determine if the day is of "high value". That is a day of the week/day of the year that corresponds to a particular likelihood that the sponsored location has a suitable number of people in it. If it is determined that it is unlikely that many (e.g. 50+) people are present, then the method returns to starting block 201, and the system continues normal operation. If it is determined that there is a likelihood that many people are present at the sponsored location, then the method progresses to block 206.

Having determined that the user's mobile wireless terminal 102 is in sponsored location, and it is a day that there is likely a sufficient number of people to be in that location, the method then progresses to block 206 where the MLCS 124 is queried to determine if the time is a "High Value Time". If it is determined that the time of day lends itself to few (e.g. <50) people being at the sponsored location, then the method returns to starting block 201, and the system continues normal operation. If it is determined that it is likely that based on the time (e.g. 0800 hours-2400 hours) there is a likelihood many persons are at the sponsored location, then the method progresses to block 208.

Having confirmed that the user's mobile wireless terminal 102 is in a sponsored location, that the day is a day that there are likely many people at that location, and the time is such that many persons are likely to be at that location, the method at block 208 determines if the user is in "Opt-In" status. "Opt-In" status is that state where the user has notified the service provider that he is amenable to receiving PUSH notices or advertising downloaded to the user's terminal to present to others, in exchange for credits toward incentives offered by the service provider. If the user is not in "Opt-In" status, the method returns to 201. If the user is in "Opt-In" status, the method proceeds to block 210. In some embodiments, the user might be required to accept notification that he is eligible for credits whenever the system determines he is eligible for them. In other embodiments, the system may require that the user "Opt-In" periodically to remain in "Opt-In" status. Yet in another embodiment, the user may have to "Opt-Out" periodically (not receive notification) to avoid receiving messages notifying him to earn credits.

At block 210 the MSC call processing center 106 transmits a message via a telecommunication system 108, to the user's wireless mobile terminal 102 notifying the user is able to earn credits for displaying advertising in accordance with the embodiments of the disclosed invention. Wireless messaging is well known to those in the art and is not described herein. The method then progresses to block 212 to determine if the user responds to the notification. If the user does not respond, the method returns to block 201. If the user responds, the method progresses to block 214.

At block 214 it is determined if the user accepts or rejects the service provider's offer. If the user rejects the offer, the method returns to block 201. In some embodiments rejection may be effected by the user pressing the same key that is used to terminate phone calls, an "opt-out" button if the terminal is so equipped, any other designated key, soft key, or by simply ignoring the solicitation. If it is determined the user accepts the service provider's solicitation then the method progresses to block 216.

At block 216, in an exemplary example of the system the user may accept and simultaneously initiate AdView by simply flipping the flat panel display screen into its second orientation to face outward and begin to display the advertising. In other embodiments the user may press an "opt-in" key to download content, enter the phone number of someone he wishes to call, and then place the call and initiate AdView, by moving the flat panel display into its second orientation. By synchronizing AdView and the dialing of a phone number entered by the user the Incentive Tracking System 126b may more easily determine the total time advertising is displayed, as the start time will coincide with the phone call. Further, while the flat panel display is displaying advertisements, the user will need to hold the terminal to his ear to carry on a conversation, as the speakerphone and "hands free" functionality will be temporarily suspended as long as an advertisement is playing. This is to insure that the terminal is at a sufficient height for persons standing by the user to see the advertisements on the flat panel display.

In one embodiment the flat panel display folds upward above the main profile of a terminal. Yet in another embodiment the flat panel folds out alongside (parallel) or up into a landscape (perpendicular) position from the main profile of a terminal. In these ways, the user's hand is less likely to interfere with the advertising presented on flat panel display while the terminal is held to his ear.

At block 218 the MSC call processing center 106 will monitor the call status to determine if it has ended. If it has not ended, the method proceeds to block 222 to determine if the advertisement being displayed has ended. If it has not the method progresses to block 224 and the advertisement continues to play until it ends. At block 222 if it is determined that the advertisement has ended, the method progresses to block 220 where the advertisement "loops" (is replayed) or moves on to a new advertisement. In some embodiments the MSC call processing center 106 may query a User Profile Database 126c to determine if the user has selected any advertising preferences.

In an exemplary embodiment of the invention, user's wireless mobile terminal 102 will be Bluetooth enabled and will transmit a Bluetooth radio signal 130 containing digital coupons to Standers-by's Bluetooth enabled devices 104 that can be used for the advertiser's goods and services. The Bluetooth signal will be sent contemporaneously with the advertisement(s) being displayed on the flat panel display. Standers-by who have Bluetooth enabled devices 104 that are visible to the transmission may choose to accept and later redeem (by printing out the coupons (from home or office printer), beam, or use other over the air transmission/near field radio transmission).

Once the MSC call processing center 106 determines the call has ended at block 218, the method progresses to block 226 to end the playing of the advertisement. In an exemplary example of the system the advertising may continue to be displayed until the user folds the flat panel display down into its first orientation, presses the key that ends the phone call, or presses an "opt-out" button if the terminal is so equipped.

Once advertising is ended the MSC call processing center 106 queries the MLCS 124 to determine if the user has powered off his wireless terminal. If not the method returns to step 201, if so, the method ends at 230.

Figure 3A:
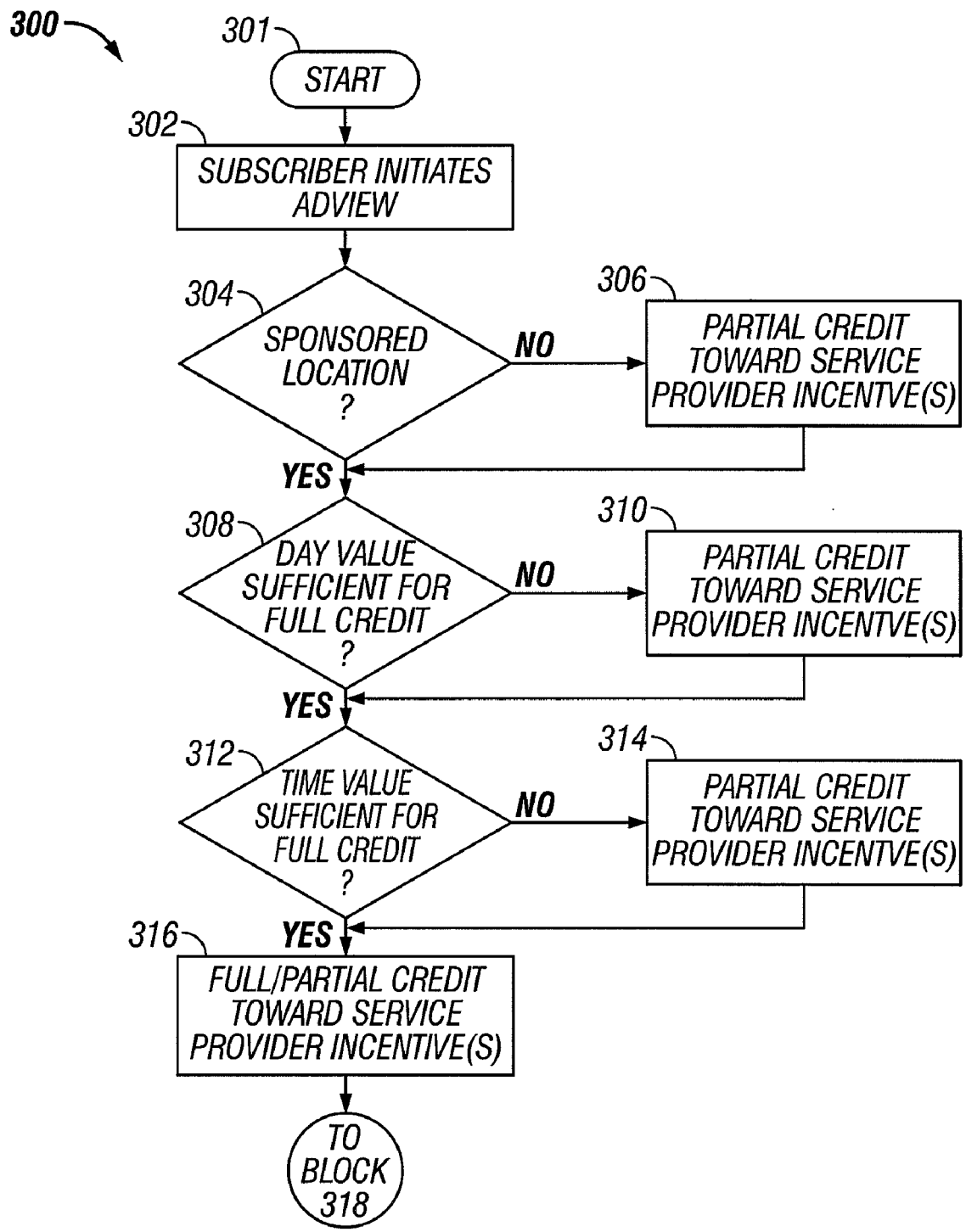
FIG. 3a and FIG. 3b. are a flowcharts illustrating an exemplary method for conducting a subscriber-initiated session of an "AdView" mode in accordance with certain embodiments.
Figure 3B:
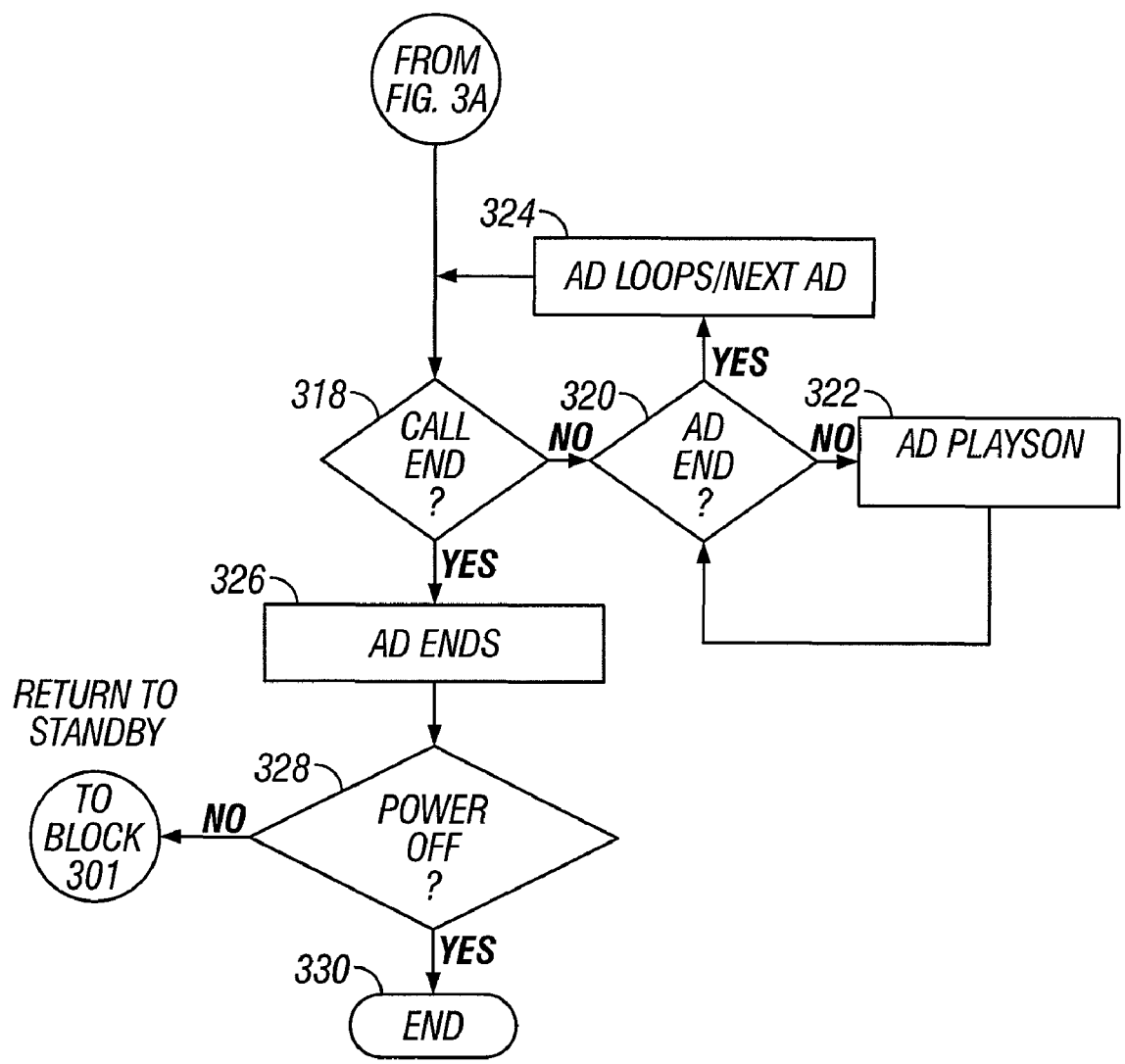

FIG. 3 is a flow diagram illustrating an exemplary method for processing a user-initiated communication to the MSC call processing system 106, in accordance with certain embodiments of the invention. The method begins at starting block 301 and progresses to block 302, where the user initiates a wireless message to the service provider, requesting to go into AdView, so that he may earn credits toward whatever incentive(s) the service provider is offering. In an exemplary embodiment of the disclosed invention, the user would fold the screen into its second orientation at any time to send a message to the service provider requesting AdView and to begin downloading web (advertising) content 114. In an another embodiment, the user's wireless mobile terminal may display advertising that has been previously downloaded into the memory of the terminal by the user. The downloading, storage, and retrieval, disabling and removing of web content from a MMS enabled mobile terminals is well known in the art and not described herein Next at block 304, the MSC call processing system 106 receives the incoming message requesting AdView and queries the MLCS 124 to determine if the User's wireless mobile terminal 102 is in a sponsored location. If it is not, the method proceeds to block 306 310 to assign some lesser credit to AdView use and transmits this information to the Billing Database 126a and Incentive Tracking Database 126b and then proceeds to block 308. If it is determined that it is a sponsored location (i.e. possible full credit toward incentive(s)) the method proceeds to block 308.

At block 308 the MSC call processing system 106 queries the MLCS 124 to determine if the day value is sufficient to credit the user full credit toward any incentive for the presentation of advertising according to the disclosed invention. If it is not, the method proceeds to block 310 to transmit this information to the Billing Database 126a and Incentive Tracking Database 126b and assign some lesser credit to AdView use and then proceeds to block 312. If it is determined that the day value is sufficient to fully credit the user toward any incentive the method proceeds to block 308.

At block 308 the MSC call processing system 106 receives the queries the MLCS 124 to determine if the time value is sufficient to credit the user full credit toward any incentive for the presentation of advertising according to the disclosed invention. If it is not, the method proceeds to block 314 to assign some lesser value to AdView use and transmits this information to the Billing Database 126a and Incentive Tracking Database 126b and then proceeds to block 316. If it is determined that the day value is sufficient to fully credit the user toward any incentive the method proceeds to block 316. At 316 the amount of credit to be assigned (full/partial) for the presentation of advertising according to the disclosed invention is determined and the method proceeds to block 318.

At block 318 the MSC call processing center 106 will monitor the call status to determine if it has ended. If it has not ended, the method proceeds to block 320 to determine if the advertisement being displayed has ended. If it has not the method progresses to block 322 and the advertisement continues to play until it ends. At block 320 if it is determined that the advertisement has ended, the method progresses to block 324 where the advertisement "loops" (is replayed) or moves on to a new advertisement. In some embodiments the MSC call processing center 106 may query a User Profile Database 126c to determine if the user has entered any advertising preferences.

In an exemplary embodiment of the invention, user's wireless mobile terminal 102 will be Bluetooth enabled and will transmit a Bluetooth radio signal 130 containing digital coupons to Standers by's Bluetooth enabled devices 104 that can be used for the advertiser's goods and services that are being advertised on the flat panel display. Stander-bys who have Bluetooth enabled devices 104 that are visible to the transmission may choose to accept and later print out the coupons (from home or office printer) to redeem in store, or in the case of a alpha-numeric coupon code, redeem the same at an advertiser's website.

In another embodiment the Bluetooth signal 132 may transmit a unique identifier of the user's mobile terminal with the transmitted coupon, so that the transmitting user 102 may earn incentives and the advertiser/service provider can measure the effectiveness of the mobile advertising campaign, by the number of coupons redeemed and the location/time transmitted with this information.

Once the MSC call processing center 106 determines the call has ended at block 318, the method progresses to block 326 to end the playing of the advertisement. In an exemplary example of the system the advertising may continue to be displayed until the user folds the screen down to it original position, presses the key that normally ends a phone call, or presses an "opt-out" button if the terminal is so equipped.

Once advertising is ended the MSC call processing center 106 queries the MLCS 124 to determine if the user has powered off his wireless terminal at block 328. If the user's wireless mobile terminal is not powered off the method returns to step 301, if so, the method ends at 330.

FIG. 4a is a front view of an exemplary mobile terminal 400 or handset having a "candy bar" form factor. The mobile terminal 400 includes one or more keys 401. In the exemplary mobile terminal 400, one of the keys 401 is a hot key 402 that is provided to quickly switch the mobile terminal 400 into the "AdView" mode. A display 403, e.g., an LCD display, is configured to provide the advertising data as discussed above. A front microphone 404 and earpiece or loudspeaker 406 a positioned on the mobile terminal 400 so as to span the distance between a user's mouth and ear for convenient use. An antenna 408 may also extend at least partially from the main body of the mobile terminal 400. A housing 405 secures and protects the components of the mobile terminal 400. In another embodiment, the antenna may be completely enclosed within the housing 405 without any substantial extension or projection.

FIG. 4b is a review view of the exemplary mobile terminal 400 of FIG. 4a. The rear side of the housing 405 encloses a rear earpiece or loudspeaker 412 and a rear microphone 414. The rear of the housing 405 may also include a battery access panel 416. When in "AdView" mode, the user holds the rear side of the handset to their face so that they listen to the call through the rear earpiece 412 to allow surrounding standers-by to view messages on the display 403.

In other embodiments, the mobile terminal 400 includes a second display on the rear of the housing 405 rather than a rear earpiece 412 and a rear microphone 414. In such embodiments, the terminal 400 is always used with the display 403 facing away from the head of the user. In one embodiment, the mobile terminal 400 does not includes the front earpiece 406 or front microphone 404. Instead the mobile terminal 400 of such an embodiment is always used with the display 403 facing away from the user.

FIG. 4c is a side view of an exemplary mobile terminal 450, or handset, having a "clam shell" form factor. The housing of the mobile terminal 450 thus includes a lower portion 452 that includes the keys 401 and an upper portion 454 that includes the display 403. The terminal 450 opens and closes along a hinge 425 that connects the upper and lower portions 452 and 454 of the housing. The exemplary mobile terminal 450 also includes the rear earpiece 412 and the rear microphone 414. When in "AdView" mode, the user holds the rear side of the handset to their face to allow surrounding standers-by to view messages on the display 403.

FIG. 4d is a rear view of a an exemplary mobile terminal 470 that is in the form of a personal digital assistant "PDA" that is similar to the exemplary mobile terminal 400 of FIG. 4a except having fewer, or no, keys, and having a larger display 403 (the location of which is shown in outline in FIG. 4d). The mobile terminal 470 also includes the rear earpiece 412 and rear microphone 414. In one embodiment, the mobile terminal 470 also includes a battery door 472. The mobile terminal 470 may also include a front microphone 404 and front loudspeaker 406 (not shown) for use as a telephone when not in "AdView" mode.

Figure 5:
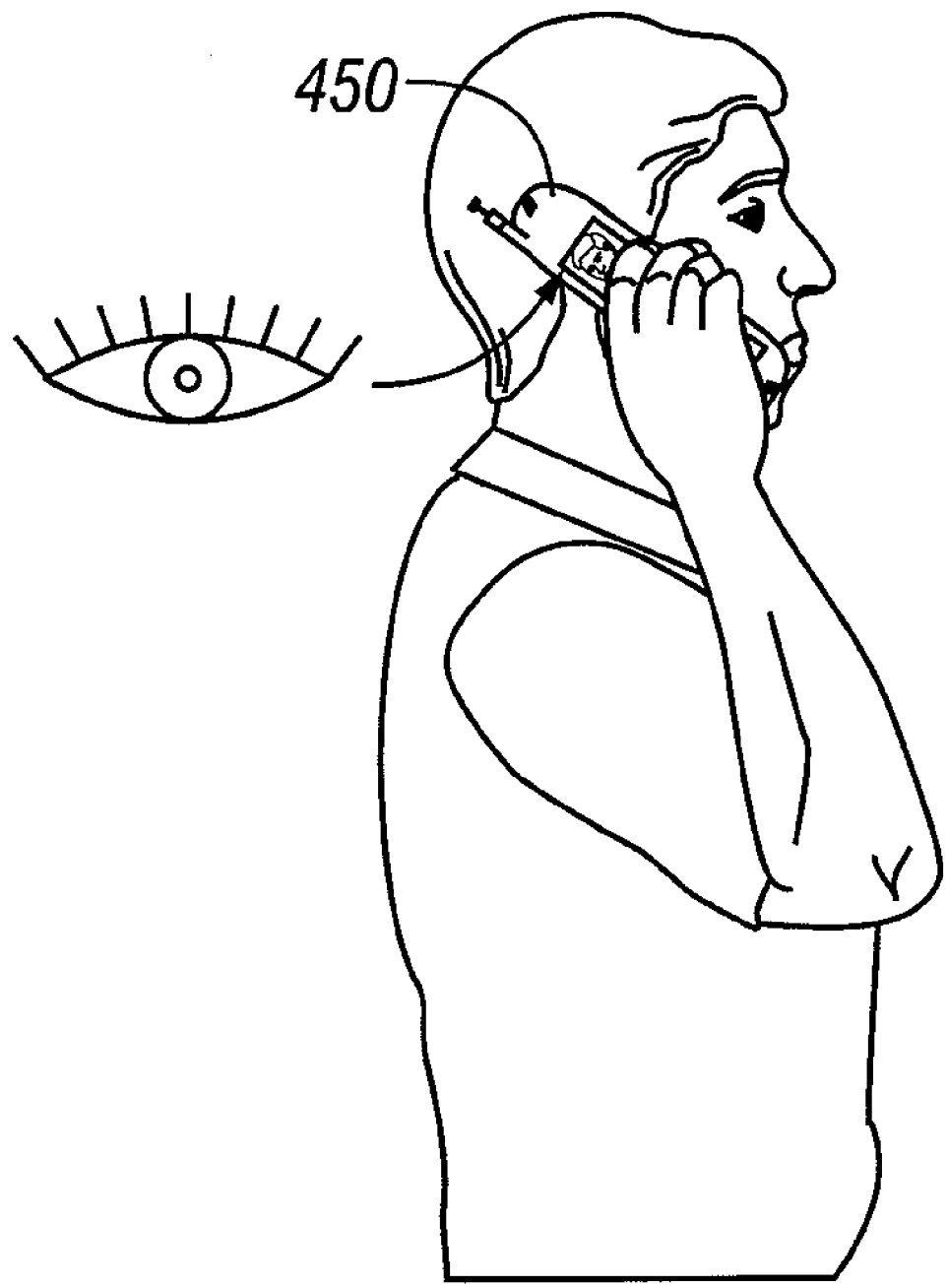
FIG. 5 is a diagram illustrating an exemplary handset, such as that of FIG. 4a in use.

FIG. 5 is a diagram illustrating a user having a conversation in "AdView" mode using the exemplary mobile terminal 450 of FIG. 4a. As discussed above, the display is positioned so that standers-by may view the messages displayed on the display.

Figure 6C:
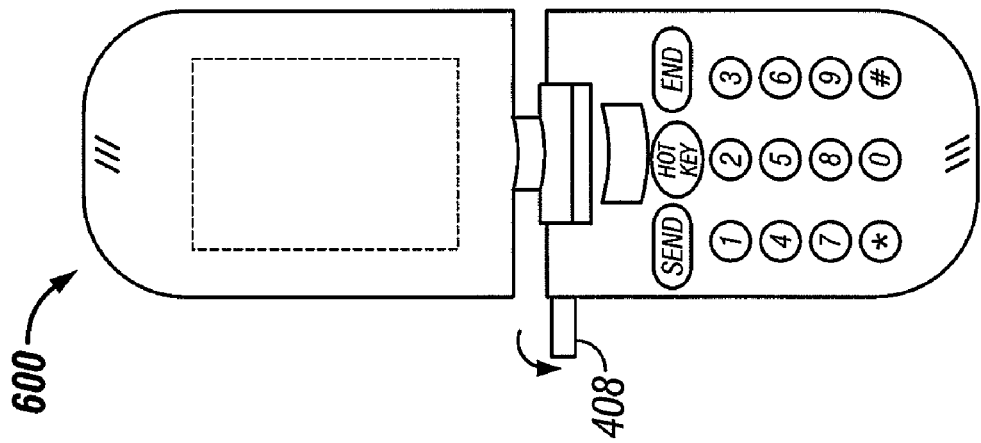
FIGS. 6a-6c are diagrams that illustrate several views of an example of external construction of a clam shell style mobile terminal, which includes an upper section that rotates to face away from a user which may be included in the exemplary system of FIG. 1.
Figure 6B:
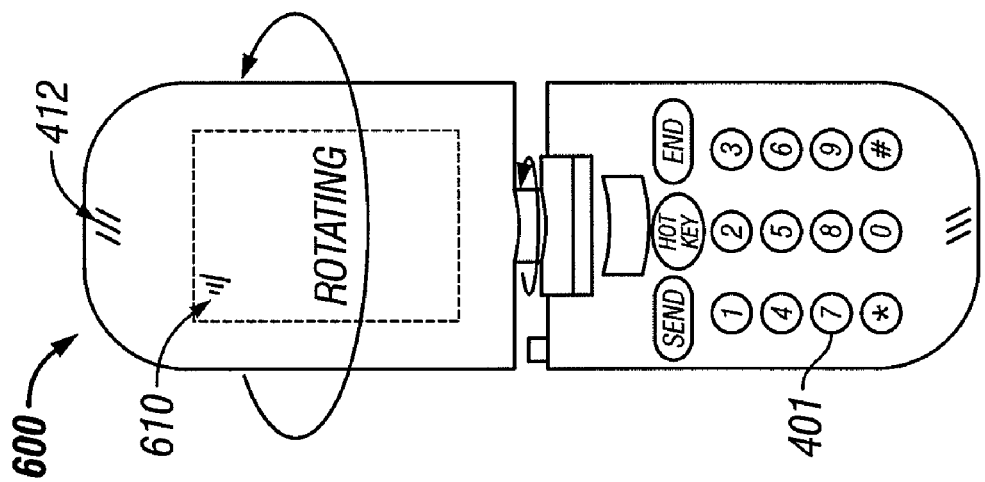
Figure 6A:
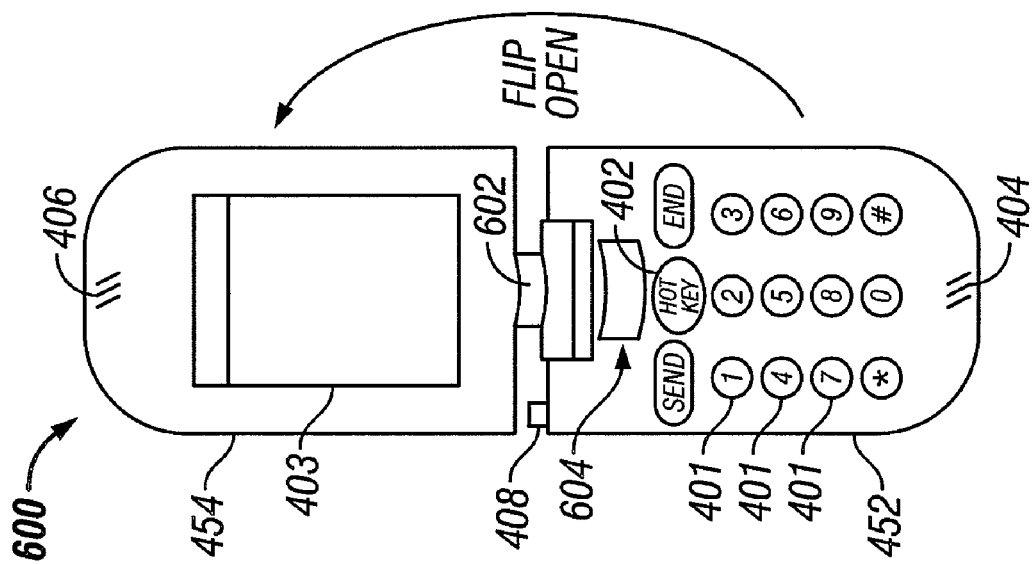

FIG. 6a illustrates the front view another exemplary mobile terminal 600 that is similar to the mobile terminal 450 of FIG. 4b. The mobile terminal 600 includes a rotatable hinge 602 that is configured to allow the display 403 to be rotated to face away from the user's head during a call. The lower portion 452 of the housing includes a recessed area 604 that is configured to receive rotatable hinge 602 when the terminal 600 is in the closed position. In one embodiment, the keys 401 includes a hot key 402 for switching the mobile terminal 600 to "AdView" mode.

FIG. 6b illustrates a view of the mobile terminal 600 when the upper portion 454 of the housing is rotated around the hinge 602. A rear face 610 of the upper portion 454 of the housing includes the rear earpiece 412. The mobile terminal 600 is configured to switch voice input from the front earpiece 406 to the rear earpiece 412 when the upper portion 454 of the housing is rotated around the hinge 602 in "AdView" mode. The location of the display 403 is shown in outline. In "AdView" mode, after opening the display by moving the upper portion 454 of the housing away from the lower portion 452 of the housing, the user rotates the upper portion 452 so that the rear face 610 is on the same side of the terminal 600 as the keys 401.

FIG. 6c illustrates another view of the terminal 600. In one embodiment, the mobile terminal 600 includes a rotatable antenna 608 that can be rotated 90° from a position extending parallel to a long axis of the mobile terminal 600 to a position perpendicular to the long axis of the mobile terminal 600.

Figure 7C:
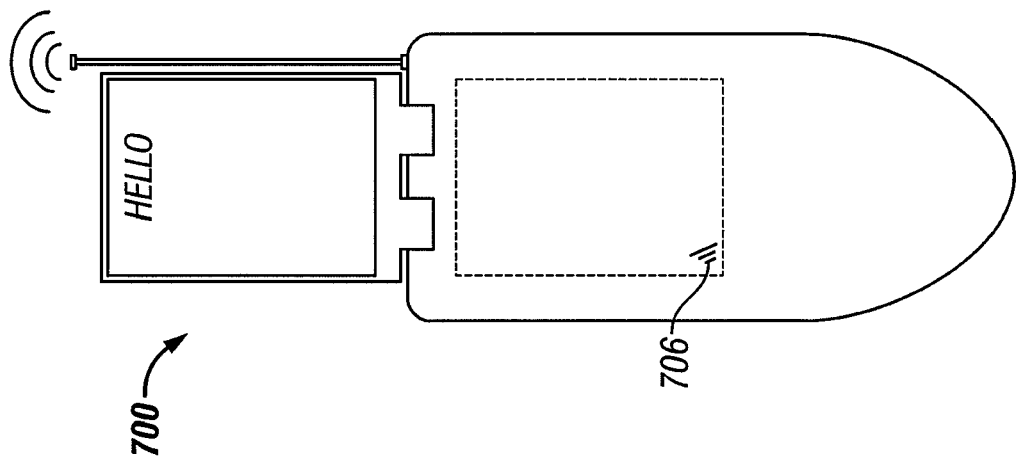
FIGS. 7a-7c are diagrams illustrating several views of an example of external construction of a "candy bar" style mobile terminal, clam shell style mobile terminal and phone enabled "PDA" type mobile terminal unfolding its flat panel display into its second orientation, above the housing of the flat panel display.
Figure 7B:
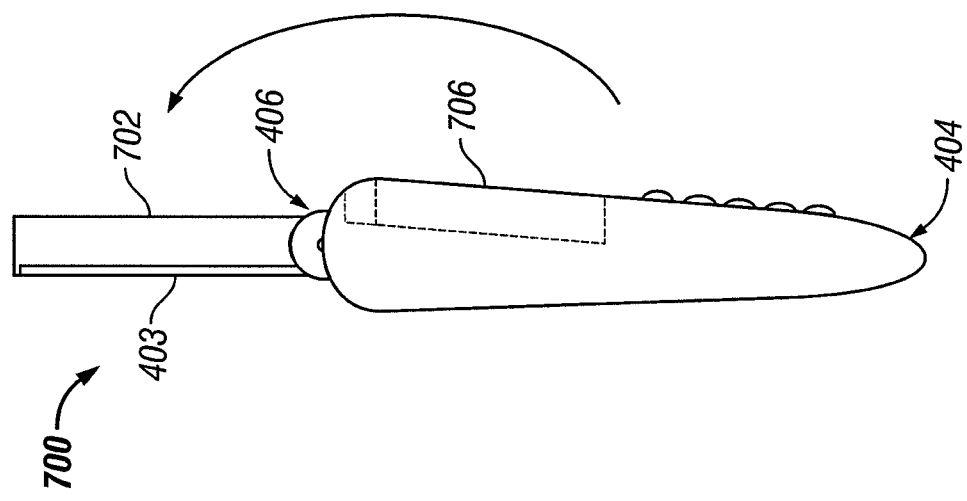
Figure 7A:
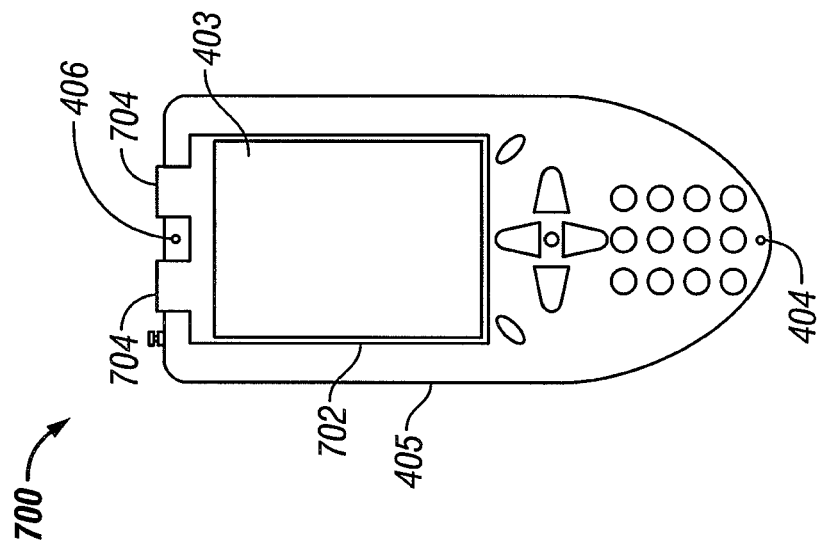

FIG. 7a illustrates a front view of another exemplary "candy bar" style mobile phone terminal 700 having a display 403 that unfolds above the housing 405 into a rear facing second orientation. In one embodiment, the front earpiece 406 is placed between hinges 704 that extend from an upper housing 702 to rotatably couple the upper housing 702 to the main housing 405 of the mobile terminal 700.

FIG. 7b illustrates a side view of the exemplary mobile terminal 700 of FIG. 7a in which the upper housing 702 is extended so that the display 403 faces rear, and away from a user in "AdView" mode. The mobile terminal 700 thus includes only a single front microphone 404 and front earpiece 406 that are used in both "AdView" and other modes of operation. In one embodiment, the housing 405 includes a recessed area 706 that receives the upper housing 702 when the upper housing is not extended.

FIG. 7c illustrates a rear view of the exemplary mobile terminal 700 of FIG. 7a in which the upper housing 702 is extended so that the display 403 faces rear, and away from a user in "AdView" mode. The projection of the recessed area 706 is displayed in outline.

Figures 8A, 8B, 8C:
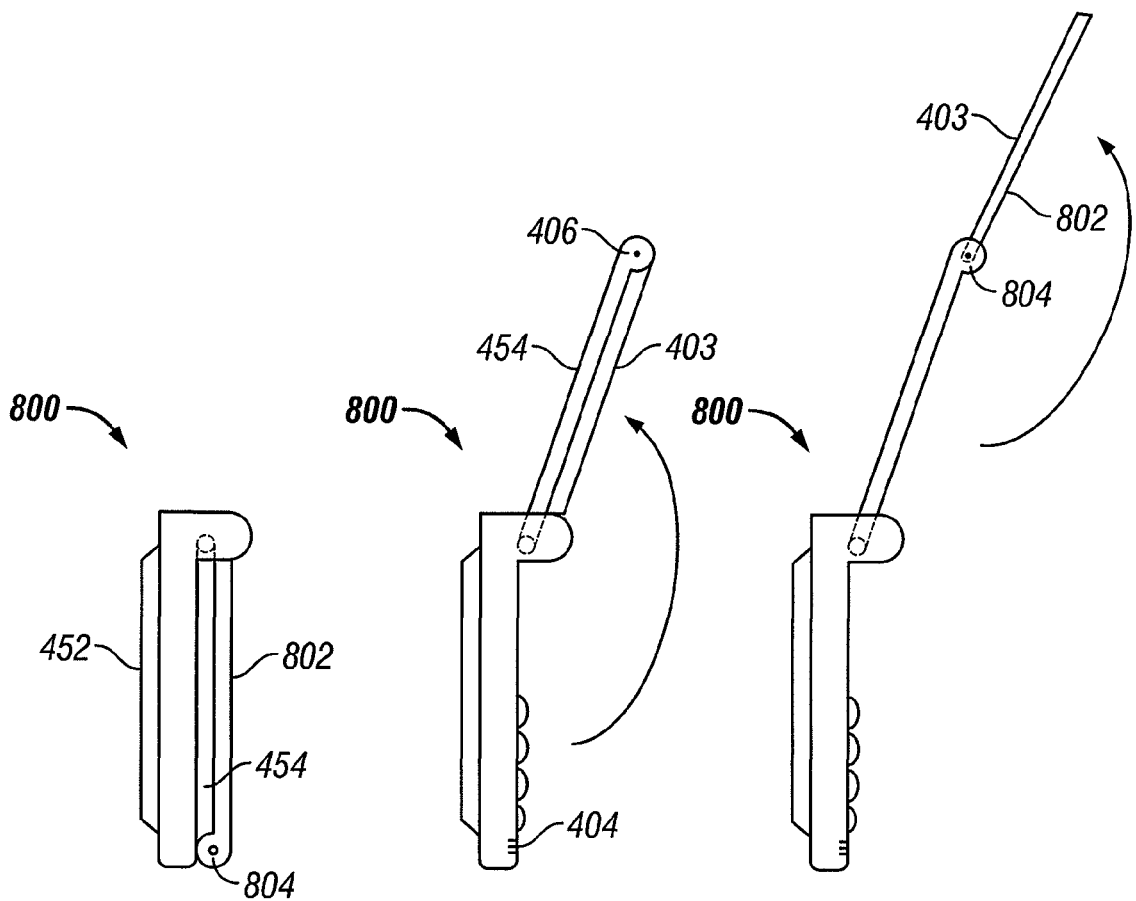
FIGS. 8a-8d are diagrams that illustrate several views of another example of external construction of a clam shell style mobile terminal having a housing that allow the display to unfold and face away from the user during a call.
Figure 8D:
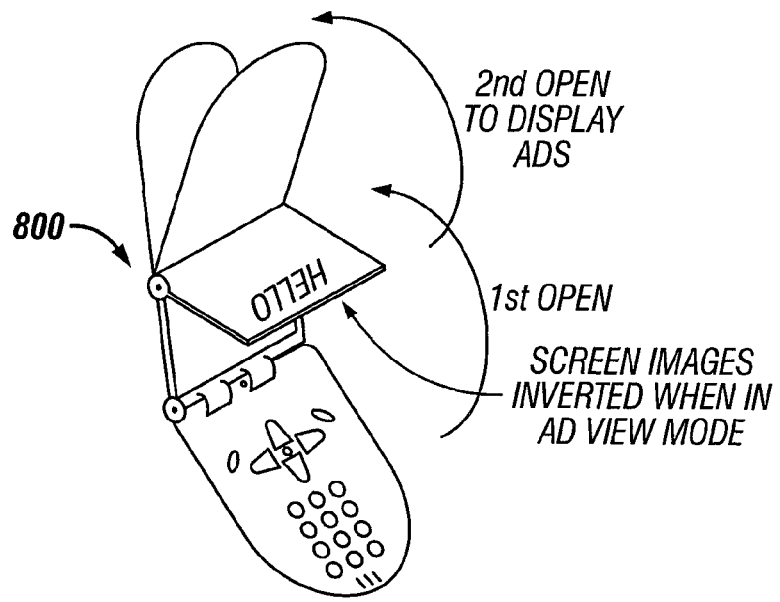

FIG. 8a illustrates a side view of another exemplary mobile terminal 800 with a "clam shell" form factor that includes a lower housing portion 452, an upper housing portion 454, and a display housing 802. A hinge 804 rotatably connects the upper housing 454 with the display housing 802. FIG. 8b illustrates another side view of the mobile terminal 800 in which the upper portion 454 of the housing is extended. In one embodiment, the earpiece 406 is on the upper portion 454 of the housing so that it is available for use as shown in FIG. 8b for non-"AdView" mode use. FIG. 8c illustrates another side view of the mobile terminal 800 in which the display housing 802 is extended so that the display 403 faces away from the user when used in "AdView" mode. FIG. 8d is an isometric perspective view of the mobile terminal 800 at several points in time as the display portion 802 is fully extended.

Figure 9C:
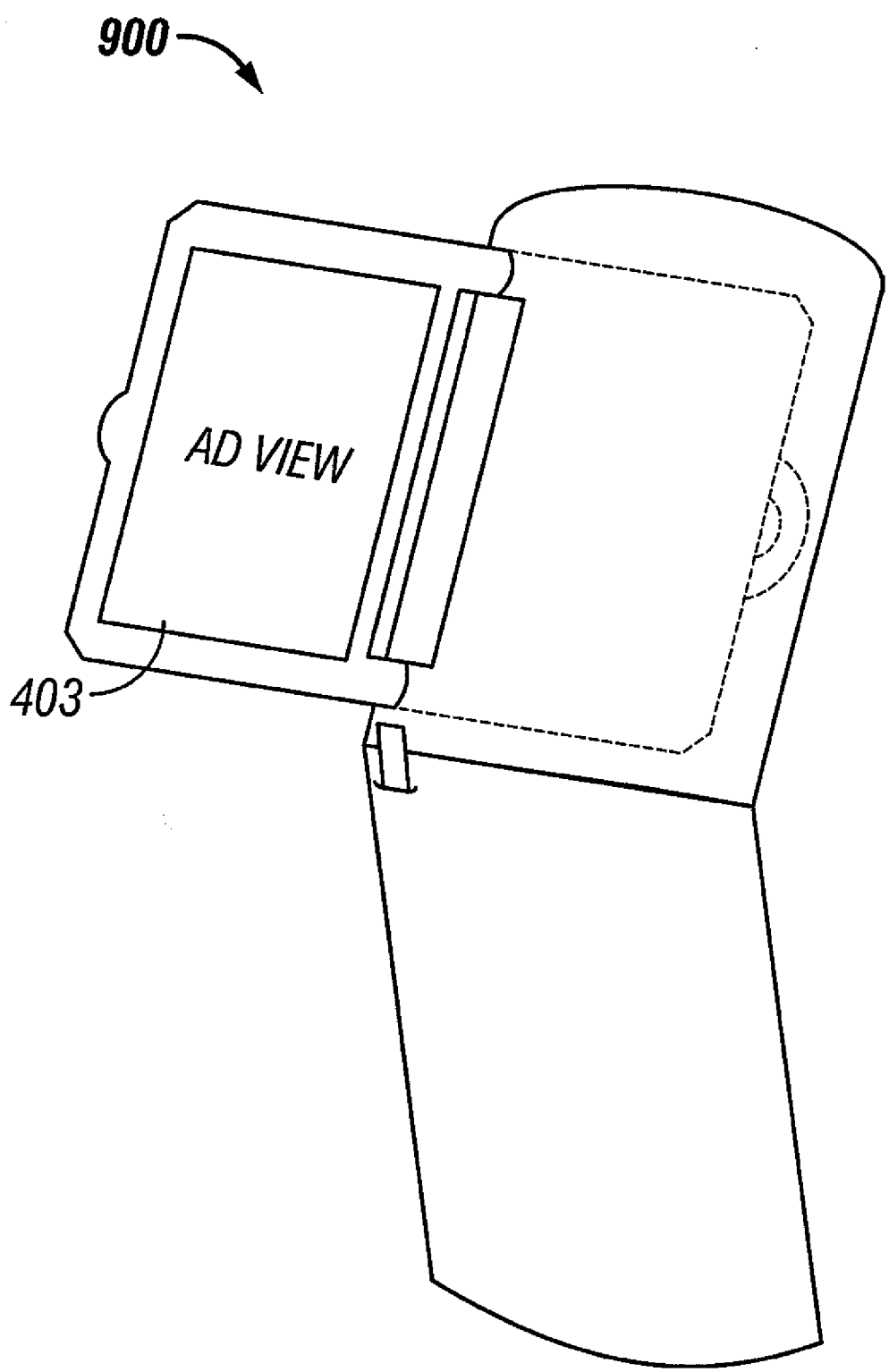

FIG. 9a illustrates a front view of another exemplary mobile terminal 900 having a "clam shell" form factor that includes a lower housing portion 452, an upper housing portion 454, and a display housing 902. A hinge 904 rotatably connects the upper housing 454 with the display housing 902. In operation, the hinge 904 rotates the display housing 902 perpendicularly to the direction of rotation of the hinge 425. FIG. 9b illustrates another front view of the mobile terminal 900 in which the display housing 902 is extended by rotating the display housing 902 around the hinge 904. In one embodiment, the earpiece 406 is on the upper portion 454 of the housing so that it is available for use as shown in FIG. 8b for non-"AdView" mode use. FIG. 9c illustrates a rear perspective view of the mobile terminal 900 in which the display housing 902 is extended so that the display 403 faces away from the user when used in "AdView" mode.

Figure 10B:
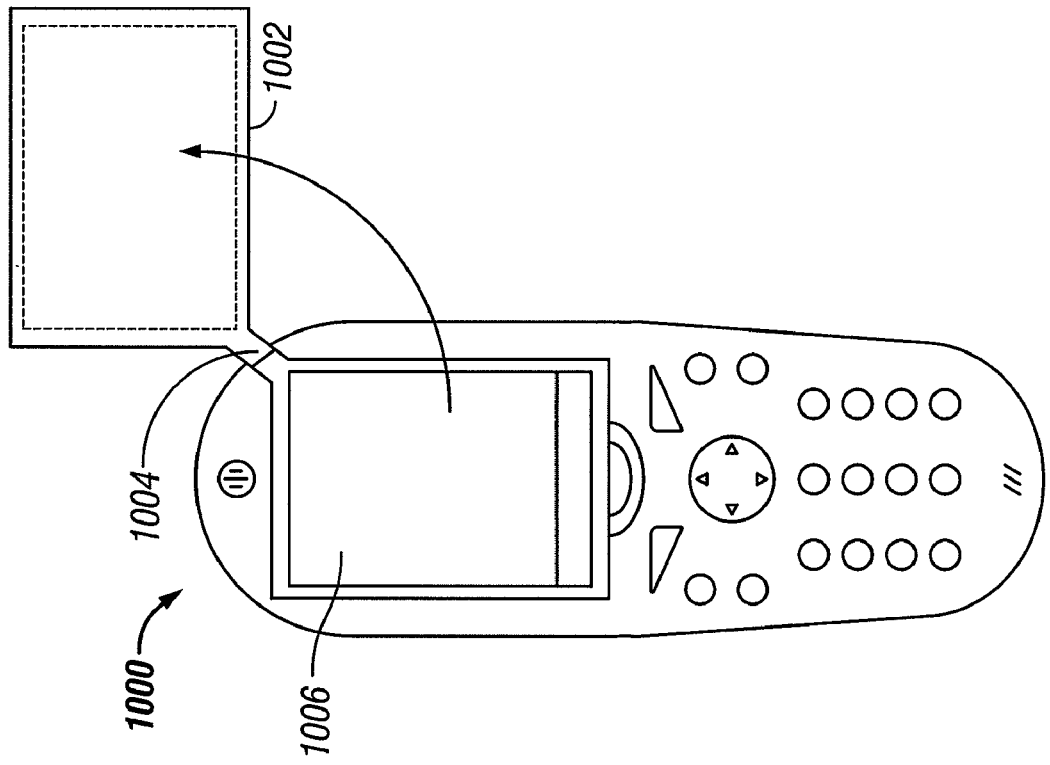
FIG. 10a to 10b are diagrams that illustrate several views of an example of external construction of a mobile terminal having a display that is hinged to unfold at an angle away from the main housing of the mobile terminal.
Figure 10A:
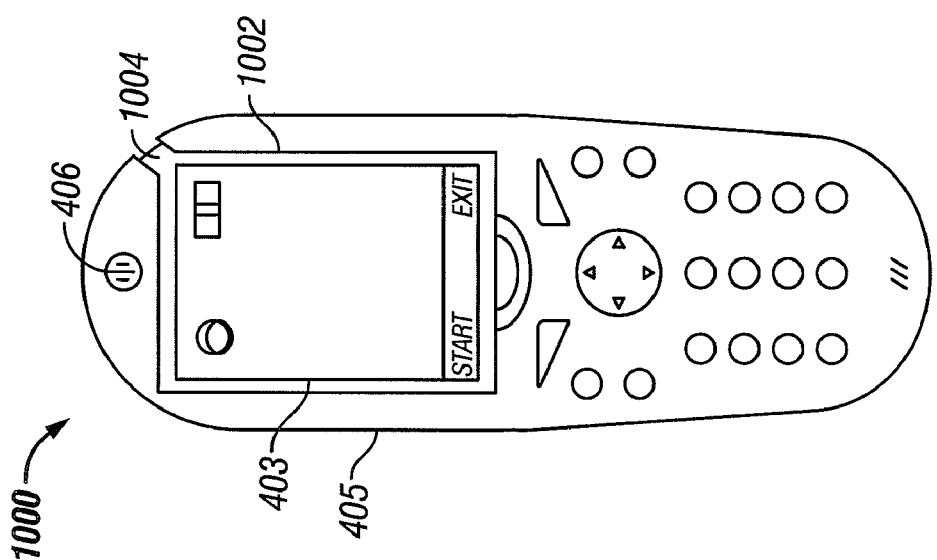

FIG. 10a illustrates a front view of another exemplary mobile terminal 1000 having a "candy bar" form factor that includes a hinged display housing 1002. The display housing 1002 is rotatably coupled to the housing 405 via a hinge 1004 that allows the display to be flipped out at a 450 to the housing 405. The display 403 is thus moved away to face away from the user's head in "AdView" mode to be visible to standersby.

FIG. 10b illustrates another front view of the exemplary mobile terminal 1000 in which the display housing 1002 is extended. In one embodiment, the housing 405 includes a recessed area 1006 that receives the display housing 1002 when closed.

In view of the above, one will appreciate that embodiments of the invention overcome many of the longstanding problems in the art by providing a way of improving the efficiency of mobile telephony, providing a way of displaying advertising in locations likely to be useful for both the advertiser and the viewer, and for tracking the effectiveness of such advertising.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A mobile communication terminal, comprising:
   a housing adapted to be held by a user;
   a keypad disposed on the housing;
   a transceiver disposed within the housing and configured to transmit and receive voice data, the transceiver further configured to receive multi media content;
   an earpiece disposed within the housing and configured to output the voice data; and
   a display disposed in the housing, wherein the display faces substantially in an opposite direction as the earpiece and wherein the display is configured to display multimedia content during a voice call, when hands-free modes of the mobile communication terminal are not in use, and the earpiece is positioned proximate to an ear of the user.

2. The mobile communication terminal of claim 1, further comprising a second transceiver configured to communicate directly with at least one other mobile terminal.

3. The mobile communication terminal of claim 2, wherein the second transceiver is configured to communicate data associated with the multimedia content to the at least one other mobile terminal.

4. The mobile communication terminal of claim 3, wherein the data associated with the multi media content comprising at least one of a coupon and identifying information of the user.

5. The mobile communication terminal of claim 3, wherein the data associated with the multi media content comprises a coupon.

6. The mobile communication terminal of claim 5, wherein the at least one advertisement is received by the transceiver based on the geographic location of mobile communication terminal.

7. The mobile communication terminal of claim 1, wherein the housing comprises first and second portions, the display being disposed in the first portion of the housing opposite the earpiece, and wherein the first and second portions of the housing are adapted to be positioned in at least two positions relative to each other.

8. The mobile communication terminal of claim 7, further comprising at least one hinged arm attaching the first and second portions.

9. The mobile communication terminal of claim 1, wherein the multimedia content is displayed during a phone call.

10. A method of providing incentives to a mobile communications terminal user for displaying multimedia content via a mobile terminal display that is disposed in a housing of the mobile terminal facing substantially opposite in direction from an earpiece of the mobile terminal when that earpiece is held proximate to an ear of a user during a non-hands free voice call, comprising:

receiving input via a input device of the mobile terminal indicative of a user response to an incentive;

configuring the mobile terminal to present multimedia content during a non-hands free voice call in response to said received input; and presenting multimedia content via the display of the mobile terminal that faces substantially opposite the earpiece when the earpiece is positioned proximate to the ear of the user during a non-hands free voice call.

11. The method of claim 10, further comprising determining whether incentives are available to the user based at least in part on the location of the mobile terminal.

12. The method of claim 11, further comprising receiving, from a service provider, notification when a determination is made that incentives are available.

13. The method of claim 12, further comprising providing a user interface for the user to opt-in for the notifications.

14. The method of claim 12, further comprising providing a user interface for the user to opt-out of the notifications.

15. The method of claim 10, wherein said incentive comprises at least one of discounted talk time, free talk time, free internet access, and free content downloads.

16. The method of claim 10, wherein the multimedia content comprises advertising.

17. The method of claim 10, further comprising communicating the advertisement to the mobile terminal.

18. The method of claim 10, further comprising communicating a coupon related to the multimedia content and the identifier of the user to a person other than the user.

19. The method of claim 18, further comprising providing the user notification of additional incentives provided based on information indicating that a communicated coupon from the user has been redeemed.

20. The method of claim 10, further comprising providing an interface for the user to choose categories of multimedia to be displayed via the mobile communication terminal display.

* * * * *